(12) United States Patent
Hardin

(10) Patent No.: US 6,795,704 B1  
(45) Date of Patent: Sep. 21, 2004

(54) TELESERVICE BASED CAPABILITY REPORT FOR RADIOTELEPHONE NETWORKS

(75) Inventor: Stephen T. Hardin, Snellville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 466 days.

(21) Appl. No.: 09/593,274

(22) Filed: Jun. 13, 2000

(51) Int. Cl.[7] .............................................. H04Q 7/20
(52) U.S. Cl. ............................. 455/432.3; 455/414.1; 455/517
(58) Field of Search .............................. 455/517, 433, 455/435.1, 434, 414.1, 418, 419, 420, 432.3, 432.1, 432.2, 435; 709/313

(56) References Cited

U.S. PATENT DOCUMENTS

| | | | |
|---|---|---|---|
| 5,638,412 A | * 6/1997 | Blakeney et al. | 370/341 |
| 5,918,177 A | * 6/1999 | Corriveau et al. | 455/432.3 |
| 5,924,026 A | * 7/1999 | Krishnan | 455/414 |
| 5,930,264 A | * 7/1999 | Nguyen | 370/466 |
| 5,950,130 A | * 9/1999 | Coursey | 455/432.1 |
| 5,966,663 A | * 10/1999 | Gleason | 455/466 |
| 6,006,091 A | * 12/1999 | Lupien | 455/435 |
| 6,044,271 A | * 3/2000 | Findikli | 370/331 |
| 6,104,924 A | * 8/2000 | Shirai | 455/418 |
| 6,178,322 B1 | * 1/2001 | Creech | 455/412.2 |
| 6,201,974 B1 | * 3/2001 | Lietsalmi et al. | 455/466 |
| 6,223,028 B1 | * 4/2001 | Chang et al. | 455/419 |
| 6,275,692 B1 | * 8/2001 | Skog | 455/414 |
| 6,456,843 B1 | * 9/2002 | Daly | 455/419 |
| 6,597,921 B2 | * 7/2003 | Thandu | 455/517 |

FOREIGN PATENT DOCUMENTS

| | | | |
|---|---|---|---|
| EP | 0685 972 A2 | * 12/1995 | H04Q/7/20 |
| WO | WO 96/33589 A2 | * 10/1996 | H04Q/7/38 |
| WO | WO 98/26625 A2 | * 6/1998 | H04Q/7/38 |
| WO | WO 98/36605 A2 | * 8/1998 | H04Q/7/38 |

OTHER PUBLICATIONS

Anderson, US 2002/0039904 A1 Apr. 2002.*

* cited by examiner

*Primary Examiner*—Charles Appiah  
(74) *Attorney, Agent, or Firm*—Woodcock Washburn LLP

(57) ABSTRACT

A teleservice based capability report and mobile station status (CRAMSS) message provides information to a base station about the capabilities of a mobile station, including its mandatory features and its optional features. The supported features that are included in the capability report pertain to those features in the latest protocol version (PV) as well as in earlier PVs.

17 Claims, 3 Drawing Sheets

TELESERVICE BASED CAPABILITY REPORT FOR RADIOTELEPHONE NETWORKS

FIELD OF THE INVENTION

The present invention relates in general to teleservice messages within a telecommunications network. More particularly, the present invention relates to reporting the capabilities and features of a mobile station within such a network.

BACKGROUND OF THE INVENTION

There are many features defined in the mobile stations specifications, such as the ANSI-136 standard. Some of these features are optional while most of them are required per the standard. Each mobile station within a telecommunications network, such as the ANSI-136 network, supports a protocol version (PV) that defines the capability of the mobile station. The different PVs cover the different revisions and capability sets of the standard.

Different PVs support different items, with some items being "mandatory" and some items being "optional". Typical features for PV0 and PV1 are shown in Table 1.

TABLE 1

| Typical features for different protocol versions | |
|---|---|
| PV0 | |
| Queue disconnect | mandatory |
| Queue update | mandatory |
| Service response | mandatory |
| Voice coder map info | optional |
| PV1 | |
| Directory address | mandatory |
| Intelligent roaming | mandatory |
| Multi-language support | mandatory |
| Complete model number | optional |

Typically, PVs are backward compatible, meaning that if a telephone is PV1, then it has all of the PV1 features as well as the PV0 features.

In order that the mobile network will know what revision of the standard that a mobile station supports, the mobile station provides its PV to the mobile network via an (air) interface message such as a registration message or the capability report. Typically, when a mobile station, such as a telephone, registers on a system, it provides its PV in a message to the system.

Wireless operators and infrastructure vendors need to know what capabilities are supported by the customer premises equipment (CPE), including the mobile station, in order to know what messages, physical channel capabilities, and features can be assigned and sent to the CPE. It is contemplated that each mobile station that is registered as a certain PV supports all of the mandatory features. However, many CPE vendors do not support all "mandatory" capabilities of the standard, and the conventional, standardized capability report does not account for mandatory features, only optional features. Thus, the wireless operator and infrastructure vendor cannot be sure of what features and capabilities a mobile station may or may not support.

In order for a mobile station to indicate that it supports a particular PV, all mandatory items for that particular PV must be supported by the mobile station. However, in commercial practicality there are situations where a infrastructure vendor and a wireless operator may choose to provide support for one or more features in a PV prior to the ability to support all of the other mandatory features of the PV.

Conventionally, the base station sends a message to the mobile station requesting its capability. The mobile station responds with a list of the optional features that it supports. It is assumed that the mobile station supports all the required features. However, oftentimes not all the PV features, even the mandatory ones, are in the telephone. The conventional capability reporting services only allow indication of support for features defined in the standard as optional. They do not allow any indication from the mobile station to the infrastructure of support for standardized feature sets which are mandatory in a particular protocol version.

Also, in the ANSI-136 standard, the conventional capability report is a layer 3 message. The wireless operator is dependent on the infrastructure vendor to provide a conduit from the CPE to the wireless operator's information database. This leads to development costs to the infrastructure vendor and the wireless operator.

The standard does support many optional capabilities. These optional capabilities are not subject to the requirement of the PVs but rather may be optionally implemented in any revision of the standard later than the revision of the optional capability. In order to know that these features are supported by the mobile station, the standard supports a reporting mechanism called a Capability Report and the Capability Update on the digital control channel (DCCH) and the digital traffic channel (DTC), respectively.

The Capability Report may be requested from the mobile station by the base station by a Capability Request flag on the DCCH. The Capability Update may be requested from the mobile station by the base station by sending a Capability Update Request on the forward DTC. Both of these services indicate the protocol and service capability of the mobile station.

There is a need to allow support for select mandatory features without the mobile station having to indicate complete support for a particular PV level. Therefore, there is a need to determine which features, both mandatory and optional, are implemented in a telephone, and which features are not.

SUMMARY OF THE INVENTION

The present invention is directed to a mobile station capability message and a system and method for generating a mobile station capability message. The mobile station capability message comprises data indicative of at least one mandatory feature supported by the mobile station. The capability storage message also can comprise data indicative of at least one optional feature supported by the mobile station. The features are each associated with a protocol version that is either the latest protocol version supported by the mobile station or an earlier protocol version. According to one aspect of the present invention, the features are part of the ANSI-136 standard.

An embodiment of the present invention comprises a system and method for generating a capability request message at a remote site, transmitting the capability request message to the mobile station, and generating a mobile station capability message responsive to the capability request message, the capability message comprising data indicative of at least one mandatory feature supported by the mobile station, the at least one mandatory feature being associated with a protocol version. The remote site is one of a base station, a mobile switching center, and a non-base station entity.

According to further aspects of the invention, the capability message is transmitted to the remote site from the mobile station, via an interface comprising, for example, point to point or broadcast mechanisms. The capability request message and the capability message can be part of respective ANSI-136 R-data messages.

According to other aspects of the invention, the capability message is stored in a storage device that can be accessed by the remote site, and receipt of the capability request message at the mobile station is acknowledged.

The foregoing and other aspects of the present invention will become apparent from the following detailed description of the invention when considered in conjunction with the accompanying drawings.

DESCRIPTION OF EXEMPLARY EMBODIMENTS AND BEST MODE

Referring now to the figures, a preferred embodiment of the system and method of the present invention will be described. For purposes of this description, it is assumed that the reader is familiar with basic telephony concepts and terminology.

The present invention is directed to a capability report that tells which features, mandatory and optional, a mobile station, such as a telephone, supports. Moreover, according to an embodiment, the report is sent directly to the wireless operator (e.g., to a message center at the wireless operator) via a carrier specific teleservice that is transparent to the infrastructure.

The capability report or message, hereinafter also referred to as a teleservice based capability report and mobile station status (CRAMSS) message supplements the existing capability request and capability report procedures in mobile stations standards and specifications, such as ANSI-136, GSM, EDGE, and CDMA, with additional elements to detect support for non-optional specification capabilities. Preferably, the present invention supports detection of channel conditions by non-base station entities for various purposes including in order to assist in the determination of delivery scheduling for other teleservice messages.

Figure 1:
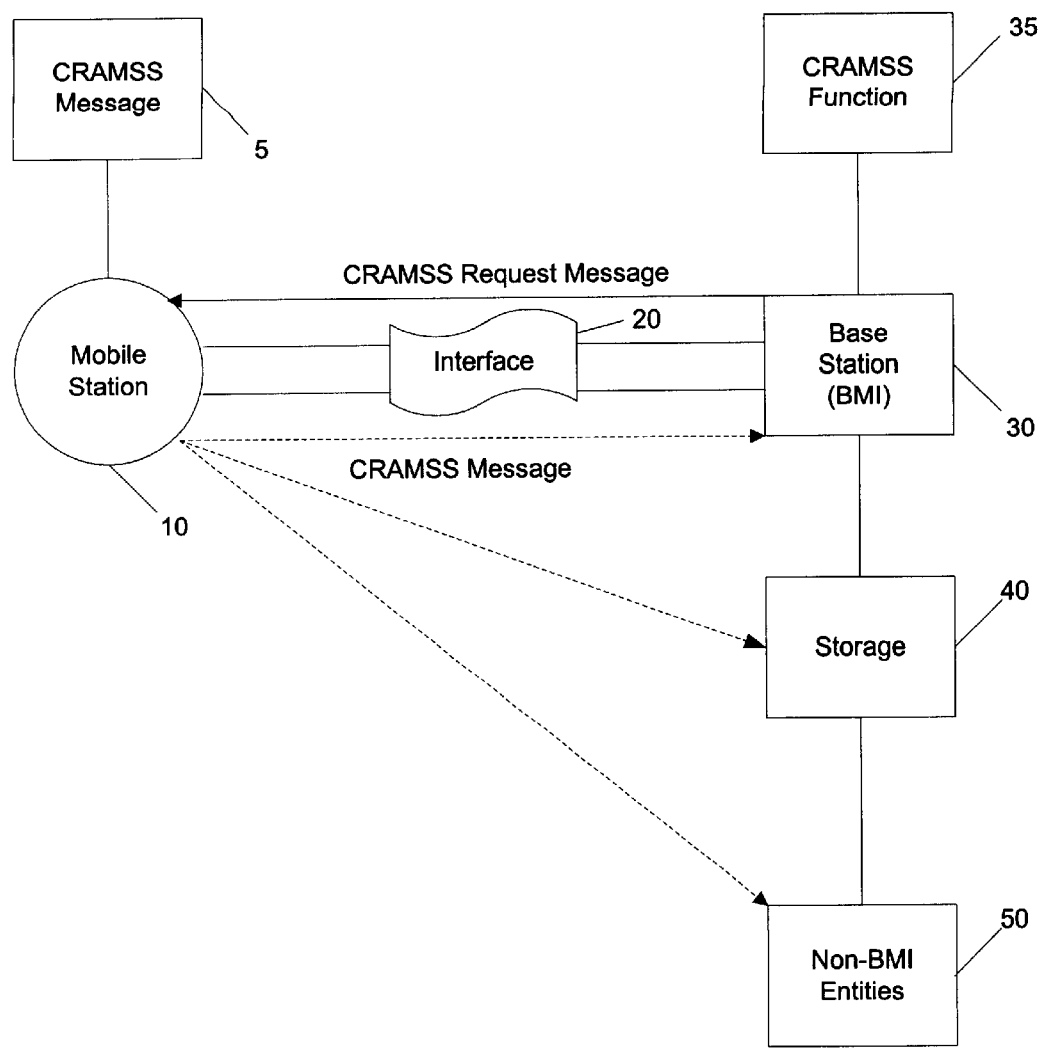
FIG. 1 shows a simplified schematic diagram of a telecommunications network in accordance with an embodiment of the present invention.

FIG. 1 shows a simplified schematic diagram of a telecommunications network useful for describing the present invention. A mobile station 10 is connected, via an interface 20, to a base station/mobile switching center/interworking function (BMI) 30. A CRAMSS message 5 or capability report is generated by the mobile station 10 and transported from the mobile station 10 to the BMI 30 using a data message having a protocol identifier that indicates the protocol and service capabilities of the mobile station 10. A CRAMSS function 35 causes the BMI 30 to generate a CRAMSS request message that is sent to the mobile station. Upon receipt of the CRAMSS request message, the mobile station 10 generates and transmits the CRAMSS message 5.

The CRAMSS message 5 can be saved in storage 40, such as a database, for access by the BMI 30 and non-base station entities 50. Alternatively, the message can be sent directly to a non-base station entity 50, such as a wireless operator (e.g., to a message center at the wireless operator) via a carrier specific teleservice that is transparent to the infrastructure. In this manner, the wireless operator is not dependent on the infrastructure vendor to provide a conduit from the BMI 30 to the wireless operator's information database, thereby reducing the development costs to the infrastructure vendor and the wireless operator.

Figure 2:
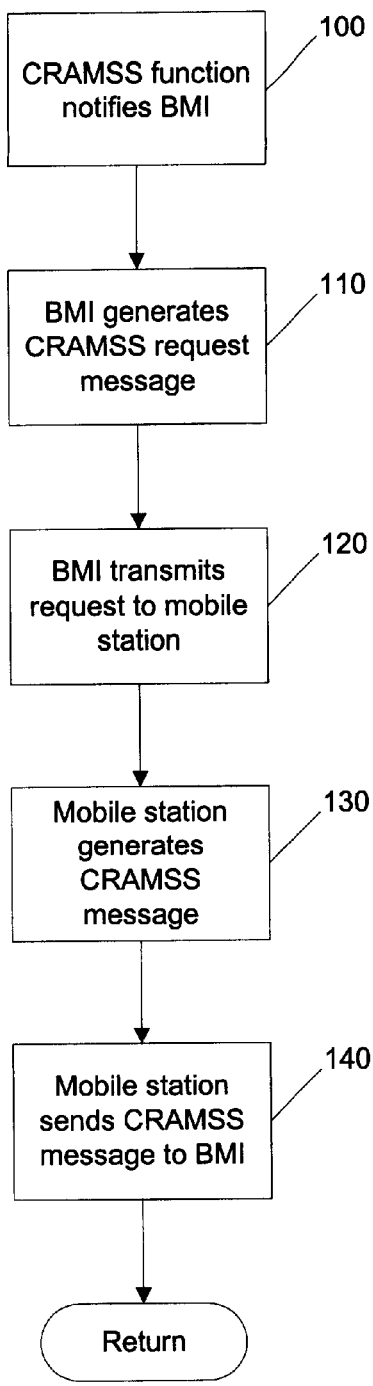
FIG. 2 shows a flow chart of an exemplary method of operation in accordance with the present invention.

A flow chart of an exemplary method in accordance with the present invention is shown in FIG. 2. At step 100, a CRAMSS function 35 alerts the BMI 30 to generate a CRAMSS request message. For example, the CRAMSS function 35 causes a CRAMSS request message to be generated whenever the mobile station capability database (residing, for example, in storage 40) is to be updated. At step 110, the BMI 30 generates a CRAMSS request message responsive to the CRAMSS function 35. The BMI 30 then transmits the CRAMSS request message to the mobile station 10, at step 120. At step 130, the mobile station 10 generates a CRAMSS message 5 (i.e., a capability report) and, at step 140, sends the CRAMSS message 5 to the BMI 30 for storage or other use. The CRAMSS message 5 can be sent to the BMI 30 either directly or via the CRAMSS function 35. After the CRAMSS function 35 receives the CRAMSS message 5, the CRAMSS message 5 can be stored in storage (e.g., storage 40) and/or sent to the BMI 30 or other non-BMI entities 50. A CRAMSS message 5 can be delivered over any interface such as via point to point or broadcast mechanisms, for example. The mobile station 10 can provide optional acknowledgments to indicate it either received or rejected the CRAMSS request message.

Figure 3:
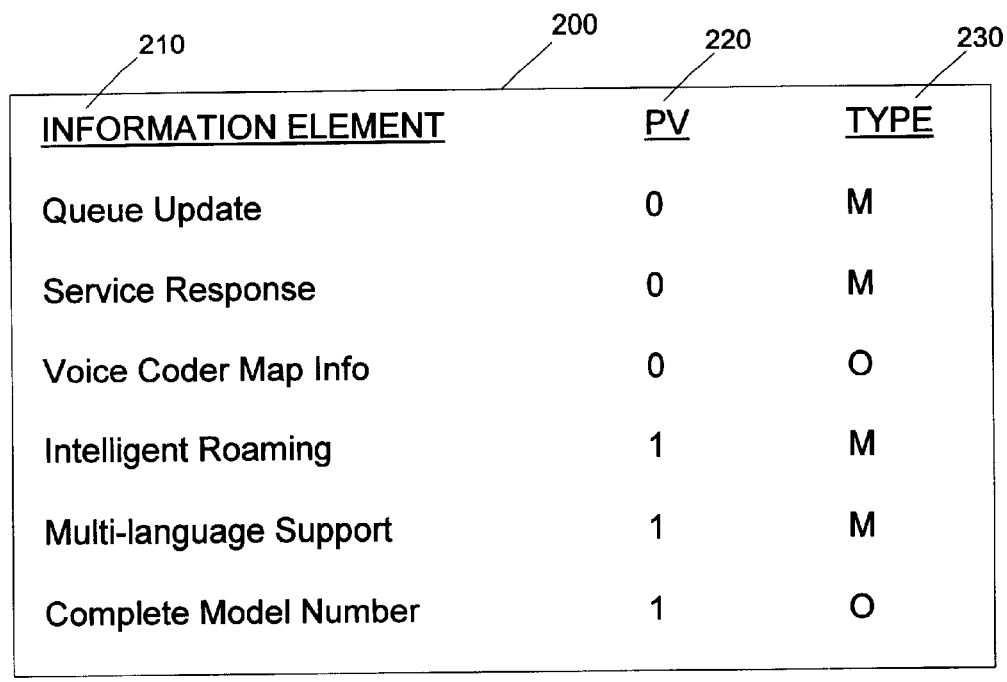
FIG. 3 shows data in an exemplary capability report message in accordance with the present invention.

An exemplary CRAMSS message 200 is shown in FIG. 3 for a mobile station that is a particular protocol version, here PV1. In the CRAMSS message 200, the information elements 210 are listed that the corresponding mobile station supports, along with their corresponding PV level 220 and their mandatory/optional status 230. Thus, both mandatory information elements (e.g., queue update, service response, intelligent roaming, and multi-language support) and optional information elements (e.g., voice coder map info and complete model number) are indicated for a mobile station. Moreover, the information elements for the current, highest PV level supported (e.g., PV1) are provided, along with the information elements for the earlier PV level(s) (e.g., PV0). Thus, both the mandatory and optional features that a mobile station supports can be ascertained by any entity having access to the CRAMSS message 200. In this manner, a wireless operator, infrastructure vendor, and any other party having access to the CRAMSS message can be sure of what features and capabilities the mobile station supports.

The present invention can be implemented in an ANSI-136 environment. In such an environment, the mobile station 10 receives requests and originates a CRAMSS message 200 over either a Digital Control Channel (DCCH) or a Digital Traffic Channel (DTC), in accordance with the rules described in ANSI TIA/EIA-136 Parts 123 and 133. The BMI 30 to mobile station 10 CRAMSS request messages can also be delivered via broadcast R-data mechanisms as defined in ANSI-136. Thus, under the ANSI-136 standard, the BMI 30 uses an ANSI-136 R-data message for delivery of the CRAMSS request message to the mobile station 10. The request message is sent to the mobile station 10, as ordered by the CRAMSS function 35, whenever the mobile station capability database (MSCD) (e.g., storage 40) is to be updated. The reasons and frequency of this update are carrier specific, and not subject to standardization.

Application layer acknowledgments are specified in the CRAMSS request message. It is assumed that a layer 3 acknowledgment (R-Data Accept or R-Data Reject) is to be used by the CRAMSS entities to indicate layer 3 delivery of a sent message. At the mobile station 10, the R-data message is received at layer 3 and an R-data Accept message is sent to the BMI 30. The mobile station 10 then extracts the R-Data Unit from the R-Data message. The mobile station 10 then determines, from the Higher Layer Protocol Identifier (HLPI), if Teleservice Segmentation and Reassembly (TSAR) has been applied to the message. Based on the HLPI, the mobile station 10 further determines if the message is a CRAMSS request message. If so, then the mobile station 10 processes the CRAMSS request message and generates a CRAMSS message 200. The mobile station 10 then transmits the CRAMSS message to the BMI 30 for storage or other processing.

If multiple mobile station initiated CRAMSS messages are requested by the CRAMSS request message, the mobile station 10 places the multiple messages in the same R-data unit to be sent back to the BMI 30.

The CRAMSS messages are transported on the air interface via the layer 3 R-data message, and more particularly, within the R-data unit information element. CRAMSS messages may be delivered via broadcast R-data mechanisms as defined in ANSI-136.

Optionally, an extended CRAMSS capability report message is sent from the mobile station 10 to the BMI 30 to indicate the protocol and service capabilities of the mobile station beyond the optional capabilities of ANSI-136. The message can take various formats.

The mobile station 10 (or network) may optionally add TSAR to the CRAMSS message 200 prior to encapsulation into the data message to be sent (e.g., the R-data or the SMDPP message).

Although illustrated and described herein with reference to certain specific embodiments, the present invention is nevertheless not intended to be limited to the details shown. Rather, various modifications may be made in the details within the scop e and range of equivalents of the claims and without departing from the invention.

What is claimed:

1. A computer-readable medium having stored thereon a data structure comprising:
    an information element indicative of a feature supported by a mobile station;
    a protocol version associated with the information element, wherein the protocol version is the latest protocol version supported by the mobile station;
    a status field indicative of a mandatory or optional status associated with the information element, wherein the information element, protocol version and status field form a mobile station capability response message;
    a second information element indicative of a second feature supported by a mobile station;
    a second protocol version indicative of a protocol version other than the latest protocol version supported by the mobile station; and
    a second status field indicative of a mandatory status associated with the second information element.

2. The computer-readable medium of claim 1, wherein the information element is indicative of a feature that is part of the ANSI-136 standard.

3. A method for determining the capability of a mobile station, comprising:
    generating a capability request message at a remote site;
    transmitting the capability request message to the mobile station; and
    generating a mobile station capability response message responsive to the capability request message, the mobile station capability response message comprising:
        an information element indicative of a feature supported by the mobile station;
        a protocol version associated with the information element, wherein the protocol version is the latest protocol version supported by the mobile station;
        a status field indicative of a mandatory or optional status associated with the information element;
        a second information element indicative of a second feature supported by a mobile station;
        a second protocol version indicative of a protocol version other than the latest protocol version supported by the mobile station; and
        a second status field indicative of a mandatory status associated with the second information element.

4. The method of claim 3, wherein the remote site is one of a base station, a mobile switching center, and a non-base station entity.

5. The method of claim 3, further comprising transmitting the mobile station capability response message to the remote site from the mobile station.

6. The method of claim 5, wherein transmitting the mobile station capability response message comprises transmitting over an interface, the interface comprising one of point to point and broadcast mechanisms.

7. The method of claim 3, further comprising storing the mobile station capability response message in a storage device.

8. The method of claim 7, further comprising accessing the storage device by the remote site to retrieve one of the mobile station capability response message and contents of a database derived from the capability message.

9. The method of claim 3, further comprising acknowledging that the capability request message has been received by the mobile station.

10. The method of claim 3, wherein transmitting the capability request message comprises transmitting over one of a digital control channel and a digital traffic channel.

11. The method of claim 3, wherein generating the capability request message at a remote site comprises generating an ANSI-136 R-data message comprising the capability request message.

12. The method of claim 3, wherein generating the mobile station mobile station capability response message comprises generating an ANSI-136 R-data message comprising the mobile station capability response message.

13. A system for determining the capability of a mobile station, comprising:

a remote site for generating a capability request message and transmitting the capability request message over an interface; and a mobile station for receiving the capability request message and generating a mobile station capability response message responsive to the capability request message, the mobile station capability response message comprising:

an information element indicative of a feature supported by the mobile station;

a protocol version associated with the information element, wherein the protocol version is the latest protocol version supported by the mobile station;

a status field indicative of a mandatory or optional status associated with the information element;

a second information element indicative of a second feature supported by a mobile station;

a second protocol version indicative of a protocol version other than the latest protocol version supported by the mobile station; and a second status field indicative of a mandatory status associated with the second information element.

14. The system of claim 13, wherein the remote site is one of a base station, a mobile switching center, and a non-base station entity.

15. The system of claim 13, wherein the interface comprises one of point to point and broadcast mechanisms.

16. The system of claim 13, wherein the interface comprises one of a digital control channel and a digital traffic channel.

17. The system of claim 13, further comprising a storage device for storing the mobile station capability response message.

* * * * *